United States

[11] 3,624,357

[72] Inventor Lyle E. Wright
9019 Spring Ave., Lanham, Md. 20801
[21] Appl. No. 885,851
[22] Filed Dec. 17, 1969
[45] Patented Nov. 30, 1971
Continuation-in-part of application Ser. No. 630,782, Mar. 23, 1967, now abandoned. This application Dec. 17, 1969, Ser. No. 885,851

[54] CREDIT CARD SALES TRANSACTION SYSTEM
4 Claims, 6 Drawing Figs.
[52] U.S. Cl. .................................................. 235/61.7 B,
200/46, 235/61.9 R, 235/61.11 R, 340/149 A
[51] Int. Cl. ....................................................... G06k 3/00,
G06k 1/18, H04q 1/30, Ho1k 43/08
[50] Field of Search ........................................... 235/61.9,
61.11, 61.11 B, 61.11 C, 61.12 N, 61.7 B; 340/149
A; 194/4; 200/46; 101/93 RC

[56] References Cited
UNITED STATES PATENTS

| | | | |
|---|---|---|---|
| 2,977,024 | 3/1961 | Harris............................ | 222/2 |
| 3,035,764 | 5/1962 | Beman.......................... | 235/61.9 |
| 3,039,582 | 6/1962 | Simjian......................... | 194/4 |
| 3,124,674 | 3/1964 | Edwards....................... | 235/61.1 |
| 3,441,714 | 4/1969 | Simjian......................... | 235/61.6 |
| 3,514,754 | 5/1970 | Schwend ...................... | 340/149 A |
| 3,519,202 | 7/1970 | Rogers ......................... | 235/61.1 X |

Primary Examiner—Maynard R. Wilbur
Assistant Examiner—Robert M. Kilgore
Attorney—Robert G. McMorrow

ABSTRACT: Upon verification of ownership of a credit card, the credit card, a calculator keyboard, and multiple printing apparatus, effect the inscription of all necessary sales transaction information on a voucher constituting a blank check thus giving the seller an unsigned negotiable instrument corresponding to the amount of the purchase.

INVENTOR
LYLE E. WRIGHT

ATTORNEY

3,624,357

CREDIT CARD SALES TRANSACTION SYSTEM

CROSS REFERENCES TO RELATES APPLICATIONS

This application constitutes an improvement in the subject matter of my prior copending applications Ser. Nos. 567,900 filed July 26, 1966, (abandoned), 583,910 filed Oct. 3, 1966 now U.S. Pat. No. 3,434,414. This application is a continuation-in-part of application Ser. No. 630,782, filed Mar. 23, 1967 (abandoned).

BACKGROUND OF THE INVENTION

1. Field of the Invention

This invention relates to credit card transaction systems and, more particularly, to a system in which the sales document becomes a negotiable instrument to be credited to the sellers account and debited against the buyers account.

2. Description of the Prior Art

It has heretofore been the accepted practice in the credit industry to issue credit cards evidencing established credit in card holder or owner with a credit agency. The cards are used in various types of transactions. However, the credit card systems heretofore known have created certain problems in the industry. Credit losses due to frauds and over extension of credit have increased product and service costs to the consumer and there is an ever present danger of cards lost with attendant liability to the card owner. Further, the billing and handling procedures inherent in the previously known systems have materially increased the cost of doing business through the use of credit cards.

Credit car verification by comparison of card information with a manual input is per se shown in U.S. Pat. No. 3,262,124. A card controlled printer including a card reader is described in U.S. Pat. No. 3,427,440. Point of sale recording is illustrated in U.S. Pat. No. 3,035,764 and keyboard and card operated printers are per se shown in U.S. Pat. Nos. 3,184,714, 3,155,031 and 3,064.560. Computerized check writing involving account information and amount information is shown in U.S. Pat. No. 3,450,041.

SUMMARY OF THE INVENTION

The present invention is directed to a credit card transaction system employing a credit card of special configuration carrying both machine readable information in coded form and embossed visual information of a legible nature identifying the credit card owner. The card owner manually keys into the sales transaction unit through a special owner identification code number keyboard, a code number known only to himself which verifies his identity with coded machine readable ownership information carried by the card from the visible, embossed indicia, and keyboard operated calculator, and card reader controlled printing of the voucher with sales indicia, ownership indicia, and banking indicia occurs. The voucher may be subsequently employed as a negotiable instrument following signing by the card owner.

The present system permits a fund holding institution such as a bank to authorize payment of funds directly from the voucher which constitutes a check or like negotiable instrument of an amount corresponding to the sales transaction, the sales transaction information being manually printed on the voucher from a second sales transaction calculator keyboard which also forms a part of the unitary apparatus. Preferably, the credit card carries a two out of five perforation code along one edge thereof including an ownership code which is compared with that manually keyed into the unit by the holder by sales personnel on the ownership keyboard. Additional information related to the code name of the purchaser, the purchaser's bank number, the bank number of the bank itself, and preferably, an individual code number indicative of the type $o$ of purchase being made, is imprinted in magnetic ink on the voucher, either from keyboard setup or from the reader, which employs photoelectric means for reading the perforated code of the card. A manually oscillating imprinter causes imprinting of the name of the bank, the owner and the owner's identification code number on the underlying or overlying voucher in legible form. The amount of each purchase, the tax and the purchase total are printed under control of the sales transaction keyboard. Only upon proper verification of the ownership code number manually keyed into the unit by the sales personnel or the card owner and that appearing on the card itself in machine readable code, is the transaction total and imprinting of the voucher effected.

In the present system, the sales document employed at the point of sale becomes a negotiable instrument and funds may be automatically debited from a buyer's account and credited to the seller's account. Thus, the separate recording of bills of sale, the compilation in the monthly statements, and subsequent issue of checks to cover the same is eliminated.

Preferably, each check data control system unit includes means for automatically imprinting the name of the seller (that is the store operator) on all transactions occuring within the store. Such information may be in the form of a present printer unit forming a part of the sale transaction printer as contrasted to the printers controlled by coded information from the card or the embossed surface of the card which in itself acts as the type font for one of the printers.

Additional advantages of the invention will become apparent to those in the industry from a consideration of the following specification and accompanying drawings.

DESCRIPTION OF THE PREFERRED EMBODIMENT

Figure 1:
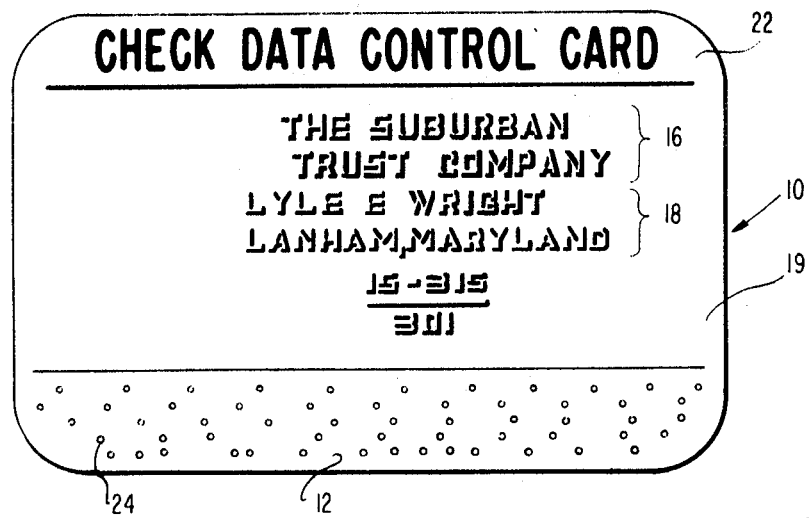
FIG. 1 is a plan view of the improved credit card employed in the practice of this invention.
Figure 2:
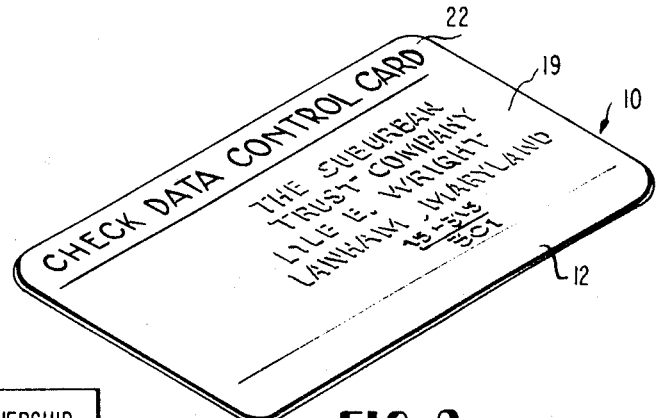
FIG. 2 is a perspective view of the card shown in FIG. 1.

Referring to the drawings and initially to FIGS. 1 and 2, the credit card 10 as employed herein constitutes a laminated structure formed of plastic or the like having three main portions, a portion 12 along one edge which carries machine readable, coded information in the form of a series of columns of perforation, preferably a two out of five code, an intermediate portion 14 which is embossed, that is, provided with raised letters defining visual information, which also act as type font, such as the name of the card owner's bank, the name of the owner and the numerical code designation for the owner's bank corresponding to that shown in letter form. Nonembossed legible information may be carried by the card as at 22, the card in this case being designated a "check data control card."

During the manufacture of the same, all of the coded information may be carried by an intermediate layer which is opaque and in which the holes are formed for each specific column in code fashion the individual perforations being indicated at 24. Relatively thick transparent exterior layers sandwich the intermediate layer so as to protect the same and the multiple layer card preferably formed entirely of plastic is then embossed in a conventional sense to form the visible information at areas 16, 18 and 20 which also function to facilitate imprinting of the information in the identical manner of conventional credit cards on a sales transaction voucher or the like, to be described hereinafter.

It is important to note that the coded information in columnar form defined by the individual perforation 24 includes information defining, preferably, the namer of the card owner's bank, the card owner's identification code number, and perhaps other information pertinent to the card owner.

Figure 4:
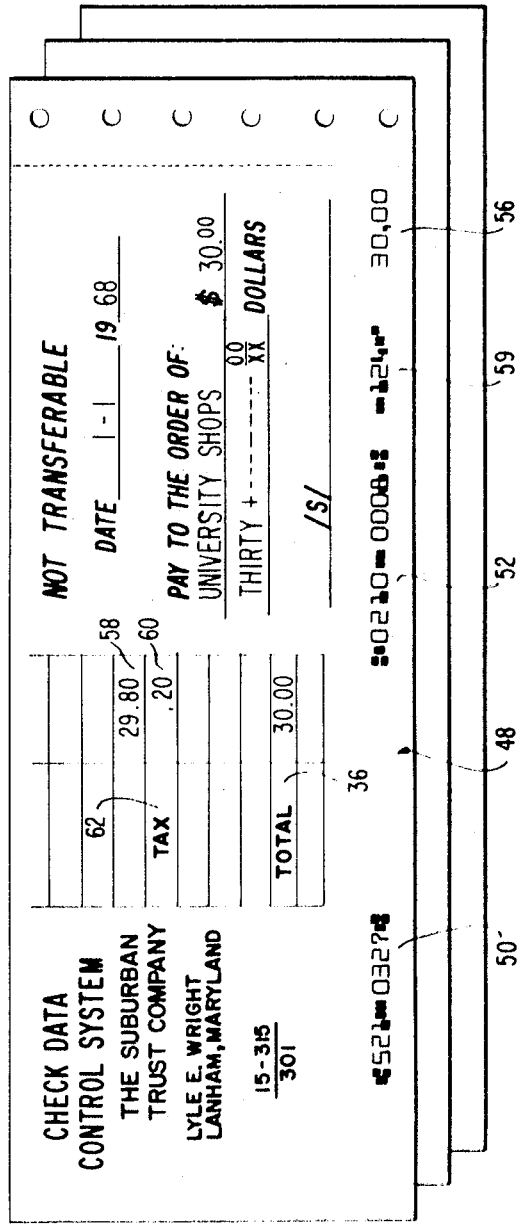
FIG. 4 is an exploded perspective view of the same voucher subsequent to imprinting.

Turning to FIG. 4, the multileaf voucher 26 forms an important element to the present invention. The voucher is padded an preferably comprises an outer, original top leaf 28, and intermediate copy leaf 30, and a bottom leaf 32, all secured to end pad portion of serrated lines of connection. The voucher, in essence resembles a combined blank check and sales receipt prior to imprinting. It contains a sales transaction recording area 34, in which the individual purchases, with respect to the sales transaction, may be imprinted and a line 36 allowing the total to be recorded including the amount of the tax, all under the control of the calculator portion of the check data control system unit 64, illustrated in FIG. 5. Voucher 26 further contains an area 38 allowing imprinting of information as to the date of the sales transaction, a signature line 40 on which the signature of the payer may be applied, corresponding to the card holder, subsequent to totalization of the transaction. Further, a line 42 is provided for imprinting in legible form, the name of the payee (the store in which the sales transaction occurs). The end of the line 42 carries a section 42a in which the total dollar amount is also printed in numerical form while the information is printed in letter form on the subsequent line 44. The voucher further has a blank area immediately adjacent the left hand edge at 46 upon which the information in areas 16, 18, and 20 of the card is directly inscribed during the operation of the system. The longitudinally extending area adjacent the bottom edge, corresponding to conventional bank practices, allows imprinting of coded account information in magnetic or nonmagnetic ink, of the type employed by many banks similar deposit institutions. This longitudinally extending area is indicated generally at 48.

Figure 3:
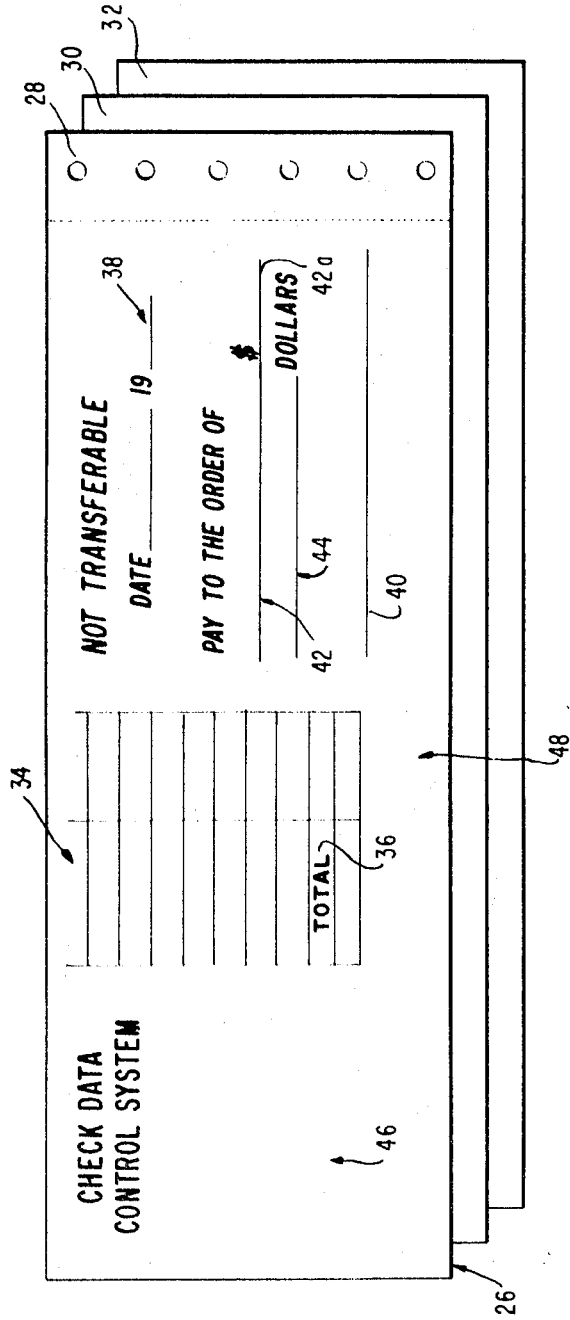
FIG. 3 is a perspective exploded view of a voucher constituting a blank negotiable instrument in manifold form, prior to imprinting.

The sequence of inscription is described hereinafter in conjunction with operation of the sales transaction unit 69 illustrated in FIG. 3, which employs photo-optical reading means, various imprinting devices and a calculator, all of these components being conventional in themselves. The present invention is directed to the particular combination and the use to which the combination is put to produce a sales transaction receipt which, in turn, constitutes a negotiable instrument requiring only the signature of the payer, corresponding to that of the true card owner.

Figure 5:
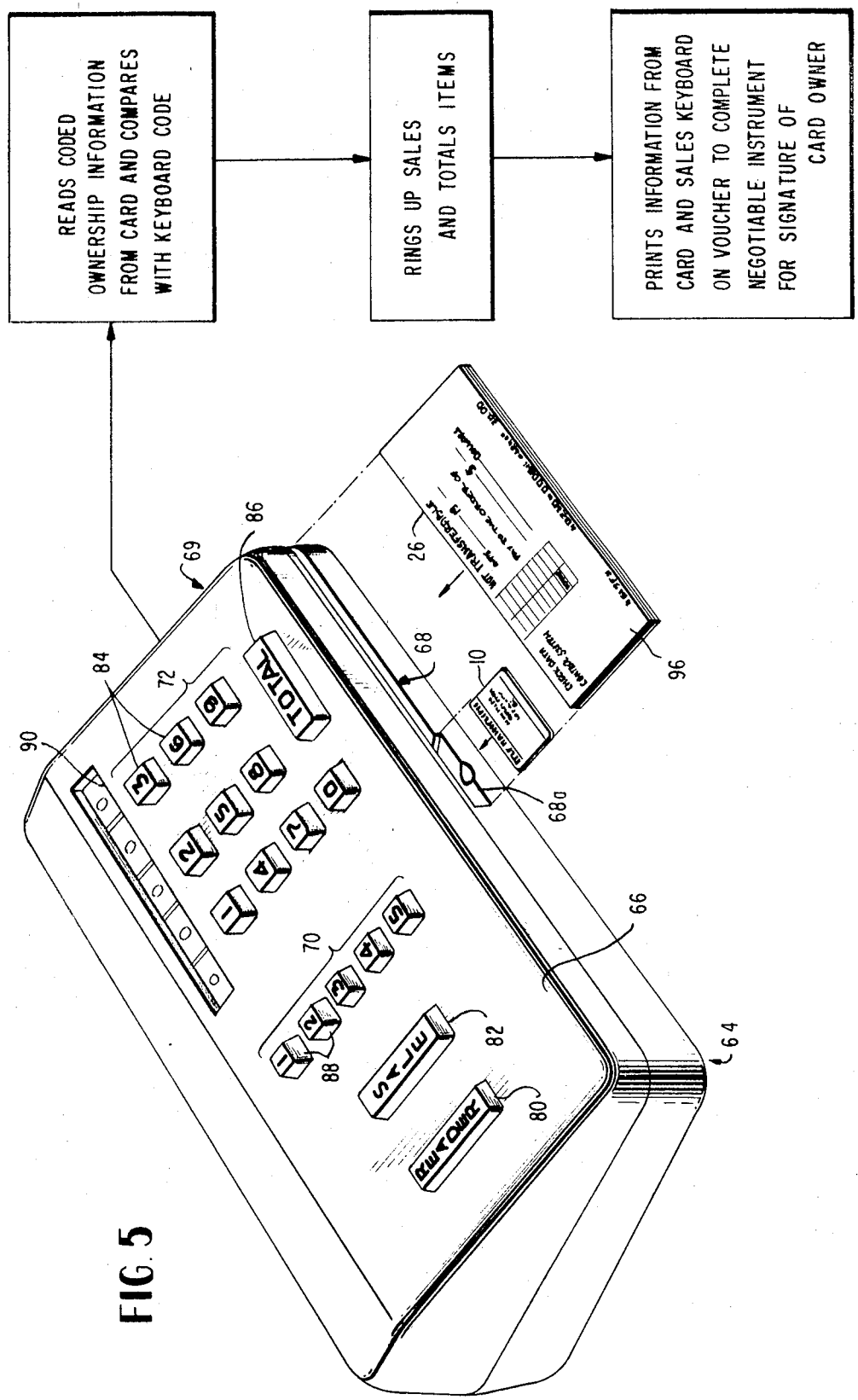
FIG. 5 is a partially diagrammatic view of the sales transaction unit components forming a principal element of the system of the present invention.

Turning to FIG. 5, the sales transaction unit 64 takes the form of a generally rectangular casing having a sloped upper surface 66 and an elongated slot on the front side indicated at 68, including a thicker left hand portion 68a for receiving the inserted credit card or check data control card 10. The elongated slot 68 received the inserted manifold voucher 26 as indicated by the narrows. In particular, it is noted that during insertion of the card and voucher, the card 10 is superimposed over the area 46 of the voucher 26 after insertion.

While the precise details of the device and its internal mechanism have not been illustrated in detail, it will be understood that each element thereof is conventional in the art and it is the specific combination of the same, employed to perform a particular function of recording a sales transaction, totalizing the same, verifying the correct identity of the card handler prior to imprinting of the voucher, and causing the voucher to constitute, when completed, a negotiable instrument that forms the heart of the present invention.

Figure 6:
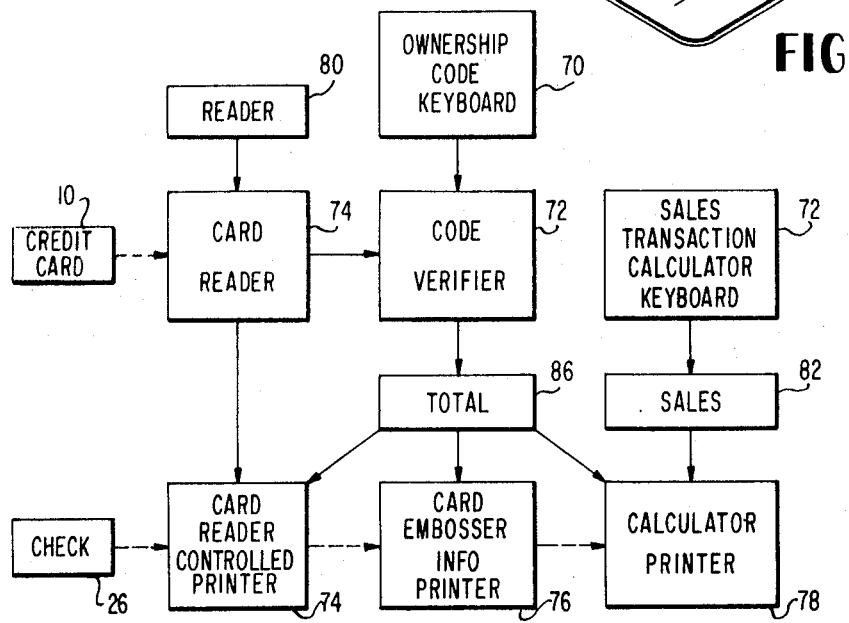
FIG. 6 shows the steps in sequence involved in practice of the present invention as related to the apparatus of the system thereof.

It is noted, however, in FIG. 6, that the check data control system unit 64 constitutes seven basic components; a credit card ownership code keyboard 70, a sales transaction keyboard 72, associated with a calculator, a photo-optical card reader 74, a credit card ownership verifier 73, a card embosser printer 76 which imprints on the voucher coded information directly from the credit card 10, a sales transaction imprinter 78 associated with the keyboard 72, and a card reader controlled imprinter 76. Components 72 and 78 define important portions of a standard accounting machine and imprinter combination.

With respect thereto, the unit 64 has protruding through its inclined surface 66, a manually depressable key or push button 80 which when depressed initiates card reading by component 74 of the unit. The adjacent sales key or push button 82 is depressed individually for each sale to clear the associated sales transaction keyboard illustrated at the right having 10 keys 84. A totalizer key or push button 86 causes imprinting on voucher 26 of the sales transaction total including the tax from the multiple sales transactions to define the negotiable amount for the negotiable instrument.

Of importance is the columnar array of the five code keys 88 numbered 1 through 5 allowing manual set up by depressing any two of the five keys to define a two bit code identical to that of a given column of perforations 24 in area 12 of the inserted card 10. Since the card owner or any holder does not know which of the columns carries the coded information corresponding to the identity of the card carrier, it is impossible for the card holder to guess the correct the two bit code corresponding to the card ownership, unless, by memory, he informs the operator of the unit 64 of the same and the selected ownership code pushbuttons 88 are depressed.

It is important to note that unless the code set up of keys 88 of the identification keyboard 70 correspond to the code of the card, none of the transactions will be recorded and depression of the total pushbutton 86 will not cause imprinting, even though the correct keys 84 have been depressed corresponding to single or multiple sales transactions. A typical sequence of operation to achieve the completely printed voucher illustrated in FIG. 5 may be easily seen from the block diagram associated with FIG. 5 of the drawings illustrating a typical sequence of steps performed by the unit 64 on the card and voucher. At the point of sale, such as the store identified as "University Shops", the card 10 is inserted within opening 68 a and the overlying voucher 26 is inserted within the full slot, such that the card 10 underlies area 46 of the voucher 26. The sales clerk, upon receiving verbally the two bit code from the card holder or owner, depresses two of the five keys 88 of keyboard 70 corresponding to the code. The individual sales transactions are then set up and imprinted by punching in the sales transaction information for appropriate lines of voucher area 34 through keys 84 as at line 58, FIG. 4, for the unit price of the purchase, such as $29.80 , and on a subsequent line 60, the amount of the tax, in this case $.20, with the tax imprinting wheel automatically printing the word "tax" adjacent to the amount as at 62. The unit, of course, includes an integral calculator performing the addition of the tax amount $.20 to the purchase amount $29.80 to give the grand total of $30.00 for imprinting of line 36, under conventional accounting practice. The unit may include, preferably, an automatically or manually operated oscillating imprinter to cause imprinting of the name of the bank, the owner and the owner identification code number or the bank code number in the area 46 of the voucher, as shown in FIG. 5, while the unit further automatically imprints the same of the store, such as "university Shop" on line 42 of the voucher. Initially, if multiple purchases occur, the price of each item is set up on the accounting keyboard portion of the machine involving depression of selected keys 84 on an item by item basis and depression of the sale button 84 for an item by item compilation and recording. This may occur before or after verification by verifier 72 under control of keyboard keys 88, forming the card carrier code input via keys 88 and defined at 70 in FIG. 6. Of course, the card 10, upon insertion within the unit 64, allows the verification to occur automatically through a conventional card reader 74, in this case of the photoelectric type, for reading the coded perforations within the card and comparing the two bit code with that set up manually via keys 88 of keyboard 70.

Depression of reader key 80 causes the information from card reader 74 to be verified with the keyboard information from keyboard 70 and the verifier controls further printing under control of the total key 86. Key 86 preferably controls the printing of information by card embosser printer 76, imprinting of additional information by card controlled printer 77, via card reader 74, and the printing of the sales total including the amount of tax, via keyboard 72, sales button 82 and calculator printer 78. The card embosser printer 76 may be a standard embossed credit card type of printer while printers, 77 and 78 comprise the conventional electronically controlled printers. The present invention requires the verifier 72 to operate in conjunction with initial depression of reader button 80 and subsequent depression of totalizing button 86 prior to automatic print out of information at areas 46, 34 and lines 42 and 44 for the negotiable instrument type of voucher 26. Of course, the card embosser may be manually operated if desired, although preferably printers 76 and 78 are automatically and electronically controlled, responsive only to depression of totalizer button 86 subsequent to verification by verifier 72.

What is claimed is.

1. In a credit card sales transaction system for use with a credit card carrying groups of indicia thereon, including machine readable information, and wherein the sales voucher constitutes a blank negotiable instrument prior to imprinting areas thereon with information from the credit card and individual sales information, the improvement comprising; a sales transaction unit including a card and voucher engaging section in which a portion of the voucher overlies the credit card to facilitate direct imprinting of information from the embossed card onto said voucher, means for reading said machine readable information from said card, first printing means for imprinting said machine read information on said voucher, first keyboard means for manual input of coded information corresponding to card ownership, verifying means for comparing machine readable information from said card with card ownership information from said first keyboard, a second calculator keyboard carried by said unit for selective input of sales information, a second printing means under control of said second keyboard for imprinting on said voucher information relating to said sales transaction, a reader pushbutton for initiating operation of said verifying means, a sales pushbutton for initiating operation of said verifying means, a sales pushbutton for controlling input of each sales transaction to said second printing means, and a total pushbutton for controlling imprinting on said voucher of information from said card and from said second keyboard and for causing said voucher to become a valid negotiable instrument, dependent only upon the signature of the card owner, said total depression of said total button causing imprinting of said information one in response to proper operation of said verifying means.

2. In a credit card sales transaction system, wherein a sales document comprises a blank negotiable instrument for effecting the transfer of funds:
a credit card carrying groups of indicia thereon including machine readable information in code form;
a multileaf voucher constituting a sales document and said blank negotiable instrument and having areas thereon for inscription of indicia from the credit card and for the inscription of sales indicia;
a sales transaction unit having a card and voucher engaging section in which the voucher and card are seated in overlying fashion to allow imprinting of information from the card to the voucher;
means for reading said machine readable information from said card, including said coded information;
first printing means for imprinting the machine read information on the voucher;
selectively operable second printing means for inscription of the voucher of individual sales transaction formation;
the unit including a first manually operable keyboard or manual input of coded ownership information corresponding to the credit card; and
a code verifier for comparing the manual input code of card ownership with machine readable ownership information directly read from said card by said card reading means.

3. The invention of claim 2, wherein:
said unit further comprises a second keyboard allowing selective input of information relative to a plurality of individual sales, said keyboard including a total key for totalizing said individual sales; and
means for operation of said total key for causing said third printing means to imprint the total of individual sales on said voucher.

4. The invention of claim 3, wherein;
the voucher includes a signature line and the information includes an identification of a depository source.

* * * * *